Aug. 23, 1955     F. O. STEBBINS     2,716,183
LAMP REFLECTOR ARRANGEMENT
Filed Dec. 5, 1952
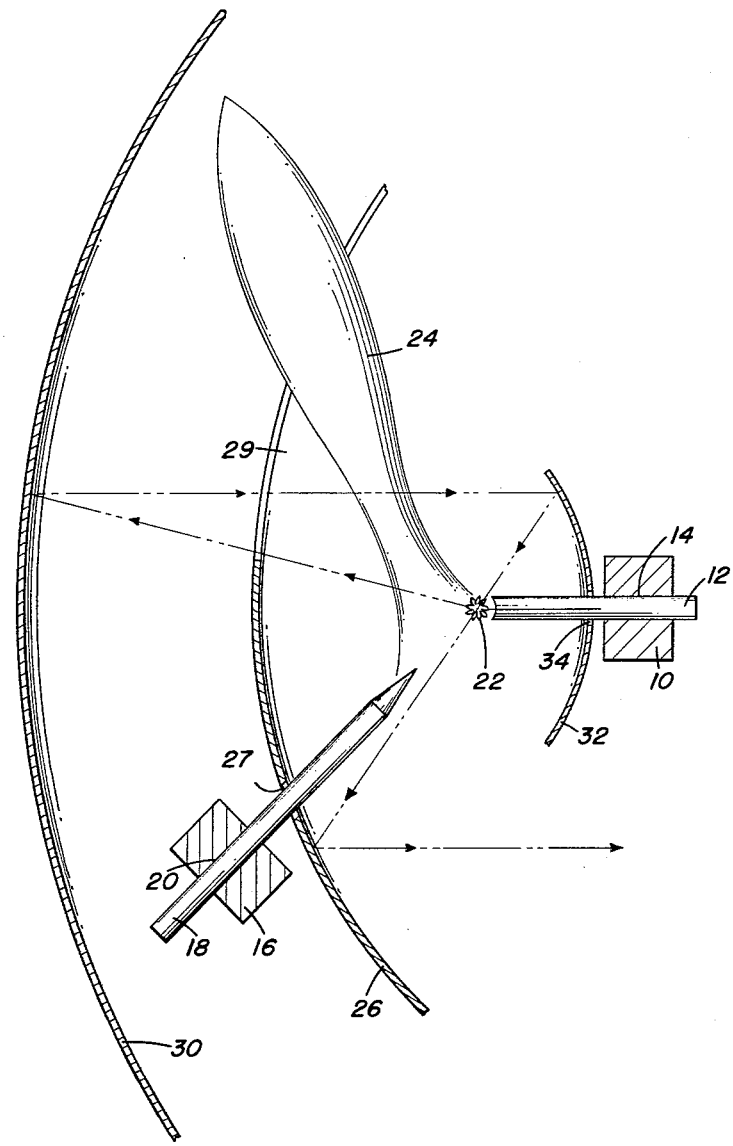
INVENTOR
FREDERICK O. STEBBINS
BY
ATTORNEYS

United States Patent Office 2,716,183
Patented Aug. 23, 1955

2,716,183

LAMP REFLECTOR ARRANGEMENT

Frederick O. Stebbins, Schenectady, N. Y., assignor, by mesne assignments, to the United States of America as represented by the Secretary of the Navy Application December 5, 1952, Serial No. 324,191

2 Claims. (Cl. 240—41.35)

This invention relates to improvements in lamps and specifically to aircraft carbon arc searchlights reflector arrangements.

Back silvered glass reflectors have advantages that make their use a requirement on aircraft searchlights. In order to obtain maximum light intensity it is desirable to use the shortest possible focus on the reflector, but the arc tail flame cracks the reflector in the portion of the reflector on which the flame plays, when a reflector with a very short focus is used. Merely removing a portion of the reflector to provide a tail flame passage is not a sufficient solution due to the accompanying loss in beam candle power. Accordingly, it is an object of this invention to provide means for saving the light that would ordinarily be lost through the tail flame passage by means of a section of longer focus reflector disposed behind the tail flame passage and behind the tail flame.

Head shadow in such a searchlight is a factor contributing to beam intensity loss. Another object of the invention is to provide an arrangement of reflectors as mentioned above, together with a secondary reflector located between the light focus and the positive head, whereby the positive head shadow, although still in existance, does not extract the light formerly absorbed by the positive head, but is reflected by the secondary reflector to the short focus reflector for subsequent appearance in the search light beam.

Other objects and features of importance will become apparent in following the description of the invention with reference to the figure in the drawing that is a schematic view showing the preferred arrangement of significant elements of the aircraft searchlight.

The drawing contains a schematic arrangement of reflectors that are intended to be used as components of a lamp, preferably an aircraft searchlight used at the present time on many types of aircraft. Accordingly, the lamp housing, electrical connections and weather seals, being well known, have been omitted in order that the precise improvements may be more easily discerned. It is understood that standard means of fastening the illustrated elements in place in the lamp housing will be used.

Positive head 10 with its carbon electrode 12 in passage 14, and negative head 16 with its carbon electrode 18 in passage 20 are fixed in such disposition that the extended longitudinal axes of the carbon electrodes 12 and 18 intersect. In this way the light focus 22 will be the point from which the arc tail flame 24 emanates. Such condition is well known.

The invention provides a primary short focus reflector 26 between the light focus 22 and the negative head 16. An aperture 27 is formed in the short focus reflector 26 and constitutes a passage for the carbon 18, so that the reflector 26 functions to prevent direct rays from the light focus impinging upon and being absorbed by head 16. A tail flame passage 29, formed by an opening in the short focus reflector 26, is present to prevent the tail flame 24 from impinging on the reflector 26 and causing damage thereto.

Primary long focus (relative to the focal length of deflector 26) reflector 30 is located behind the passage 29, but is spaced sufficiently distant from the light focus 22 so that the tail flame 24 does not touch it. This light reflector has the function of saving the light that would ordinarily be lost through passage 29.

A secondary reflector 32 has an aperture 34 in it, constituting a carbon passage for the positive carbon 12. Reflector 32 is disposed between the light focus 22 and the positive head 10, and it functions in a dual capacity. Although there will be positive head shadow due to the presence of head 10, the secondary reflector 10 prevents direct rays from the light focus 22 from being absorbed by the head 10 with a corresponding loss of light intensity. Secondly, the light (follow the arrows in the drawing) that passes through passage 29 is directed to the secondary reflector, whence it is directed to the surface of the primary short focus reflector 26. Any light rays striking that surface are added into the searchlight beam, and thus, are usefully directed.

It is apparent that various modifications may be made without departing from the scope of the following claims.

What is claimed is:

1. In a carbon arc lamp, a positive head provided with a carbon that protrudes therefrom, a negative head provided with a carbon that protrudes therefrom at an angle to the longitudinal axis of the carbon in the positive head to provide a light focus between the spaced inner ends of the carbons from which emanates a tail flame, a short focus reflector having an aperture through which said negative head carbon extends and disposed between the light focus and said negative head thereby minimizing negative head shadow, said short focus reflector having a tail flame passage, a primary long focus reflector disposed behind said passage, and means disposed between the light focus and said positive head for preventing light absorption by the positive head and for reflecting light rays from the primary long focus reflector to the primary short focus reflector.

2. In a carbon arc lamp, a positive head provided with a carbon that protrudes therefrom, a negative head provided with a carbon that protrudes therefrom at an angle to the longitudinal axis of the carbon in the positive head to provide a light focus between the spaced inner ends of the carbons from which emanates a tail flame, a short focus reflector having an aperture through which said negative head carbon extends and disposed between the light focus and said negative head thereby minimizing negative head shadow, said short focus reflector having a tail flame passage, a primary long focus reflector disposed behind said passage, and means disposed between the light focus and said positive head for preventing light absorption by the positive head and for reflecting light rays from the primary long focus reflector to the primary short focus reflector, including a secondary reflector having an aperture through which the positive head carbon passes.

References Cited in the file of this patent

UNITED STATES PATENTS

| 1,152,007 | Dake | Aug. 31, 1915 |
| 2,068,795 | Gleick | Jan. 26, 1937 |

FOREIGN PATENTS

| 23,969 | Great Britain | of 1902 |
| 231,637 | Great Britain | Apr. 9, 1925 |
| 700,077 | France | Dec. 22, 1930 |